United States Patent [19]

Sullivan

[11] Patent Number: 5,399,335
[45] Date of Patent: Mar. 21, 1995

[54] PROCESS FOR PREPARING BISMUTH VANADATE PIGMENTS

[75] Inventor: Robert M. Sullivan, Washington, Pa.

[73] Assignee: Ciba-Geigy Corporation, Ardsley, N.Y.

[21] Appl. No.: 154,643

[22] Filed: Nov. 19, 1993

[51] Int. Cl.⁶ .............. C01G 29/00; C01G 31/00; C04B 14/00
[52] U.S. Cl. .................. 423/593; 106/479
[58] Field of Search ............ 106/479; 423/593, 65

[56] References Cited

U.S. PATENT DOCUMENTS

| | | | |
|---|---|---|---|
| 4,026,722 | 5/1977 | Hess | 423/593 |
| 4,115,141 | 9/1978 | Piltingsrud | 106/288 |
| 4,115,142 | 9/1978 | Hess | 106/288 |
| 4,937,063 | 6/1990 | Sullivan | 423/593 |

FOREIGN PATENT DOCUMENTS

4119668 12/1992 Germany.

OTHER PUBLICATIONS

Gottlieb et al., Thermal Analysis, vol. 1, Proceedings Fourth ICTA, Budapest 1974, pp. 675–679.
Roth et al, Synthesis and Stabiling of Bismutotantalite, Stibiotantalite and Chemically Similar $ABO_4$ Compounds pp. 1348–1356, 1963, American Mineral., 48.
Translation of German document 4,119,668.

*Primary Examiner*—Gary P. Straub
*Assistant Examiner*—Steven Bos
*Attorney, Agent, or Firm*—Luther A. R. Hall

[57] ABSTRACT

Bismuth vanadate ($BiVO_4$) is prepared by reaction in nitric acid suspension of a solid bismuth-containing compound and a solid vanadium-containing compound while being subjected to milling at a temperature from 20°–100° C. The bismuth vanadate prepared by this process is a bright, high tinting yellow pigment particularly useful in pigmenting polymers and paints.

22 Claims, No Drawings

PROCESS FOR PREPARING BISMUTH VANADATE PIGMENTS

The instant invention pertains to a method of preparing bismuth vanadate pigment of great brilliance and high tinting power by wet milling an acid suspension of a solid bismuth starting material and a solid vanadium starting material to form the desired bismuth vanadate.

BACKGROUND OF THE INVENTION

U.S. Pat. Nos. 4,115,141 and 4,115,142 teach that bismuth vanadates are pigmentary, yellow compounds useful for coloring plastics and paints.

A variety of precipitation and solid state reactions have also been disclosed for preparing such bismuth vanadates and related compounds. For example, before the discovery of the indicated pigmentary properties, Gottlieb et al., Therm. Anal. Fourth ICTA, Budapest, 1, 675 (1974) describe synthesis of bismuth vanadates by solid state preparations wherein intimately mixed bismuth and vanadium oxides are heated at 800° C. for sixteen hours and by precipitation methods wherein solutions of sodium vanadate and bismuth nitrate are reacted at controlled concentrations, temperatures, time and pH. Correspondingly, Roth et al., Amer. Mineral. 48, 1348 (1963) disclose solid state approaches involving heating of the mixed oxides.

U.S. Pat. No. 4,937,063 describes an improved process for the preparation of compounds based on bismuth vanadate where precursor materials are calcined in the solid state at a temperature sufficiently high to form the vanadate and then the calcined reaction product is wet ground in the presence of a strong alkaline medium so that the final pH level is 7.0-13.0.

German Offen. 4,119,668 teaches a process similar to the instant process wherein a mixture of bismuth and vanadium oxides are mixed as a suspension in nitric acid at a temperature under 100° C. to give bismuth vanadate yellow pigment.

DETAILED DISCLOSURE

The instant invention pertains to a process for the preparation of bismuth vanadate pigment which comprises (a) suspending a 10-50% by weight mixture of a solid bismuth compound and a solid vanadium compound where the molar ratio of bismuth:vanadium is 1:1 to 1:0.8 in a 90-50% by weight aqueous mineral acid solution at a pH of about 1, (b) wet grinding the suspension from step (a) at a temperature between 0° C. and the reflux temperature till the bismuth and vanadium compounds are transformed into the yellow pigmentary bismuth vanadate, and (c) isolating the bismuth vanadate by removal of the residual mineral acid solution.

Preferably the weight of the solid bismuth and vanadium compounds is from 20-40% by weight of the suspension.

Preferably the molar ratio of bismuth:vanadium is from 1:1 to 1:0.9. A slight excess of bismuth is not objectionable in the final product, but an excess of vanadium in the final product is undesirable.

Preferably the weight of aqueous mineral acid is 80-60% by weight of the suspension. There must be sufficient acid present to make a fluid slurry and to maintain the pH at about 1.

The mineral acid is hydrochloric acid, sulfuric acid, phosphoric acid or nitric acid. Preferably, the mineral acid is sulfuric acid or nitric acid, and most preferably nitric acid. Mixtures of mineral acids can also be used.

Additionally, the alkali metal salts of said acids can be used beneficially in the presence of said mineral acids, preferably in the presence of another mineral acid. Such salts are typified by sodium nitrate which is useful in the conjunction with sulfuric acid.

Preferably the wet grinding is carded out in a pebble or ball mill, a vertical or horizontal bead mill, or in an attritor or in a vibro-energy mill made from or lined with porcelain, ceramic, stainless steel, polyurethane or other material capable of resisting damage from the acid environment required, and said mill charged with properly sized grinding media that are similarly resistant to the acid environment.

The bismuth and vanadium starting material compounds may initially begin to dissolve in the nitric acid, but as insoluble bismuth vanadate pigment starts to form and precipitate out on the surface of the original compound and/or compounds, a barrier is formed to further dissolution. The dissolution process thus begins to stop and the desired reaction fails to take place to completion. It is the wet grinding step in a pebble or ball mill, or other milling equipment which is essential as this grinding continually produces new surfaces on the original bismuth and vanadium starting material compounds allowing the necessary dissolution and reaction processes to proceed to completion to form the bismuth vanadate pigment.

A crucial part of the instant process is the wet grinding step. The exact nature of the grinding mill and the size of the grinding media (i.e. pebbles, balls, etc.) are not in themselves critical as long as effective energetic grinding occurs. Smaller media and higher temperatures facilitate the process of converting the bismuth and vanadium starting materials into pigmentary bismuth vanadate.

As far as temperature is concerned, the instant process can provide high quality bismuth vanadate pigment at moderate temperatures (i.e. 20°-35° C.) especially when the process is run in a small mill with longer (overnight) grinding times. If a larger mill is used, higher temperatures (up to 100° C.) during grinding concomitantly occur and shorter grinding times are required for complete conversion of the starting materials into pigmentary bismuth vanadate. Temperatures in the range of 65°-70° C. seem optimum for the process to give high quality bismuth vanadate with grinding times of about 6-8 hours.

The milling or grinding step is always accompanied by the generation of heat and an increase in the temperature of the mill slurry. This increase in temperature, as is more evident with the use of larger mills, increases the rate of reaction of the starting materials thus producing the desired high quality bismuth vanadate pigment in shorter periods of time.

The bismuth compounds which can be used as starting materials in this process are, for example, bismuth trioxide, bismuth subnitrate, bismuth subcarbonate, bismuth carbonate, bismuth nitrate, bismuth oxalate, bismuth hydroxide and bismuth metal. Preferably, the bismuth starting material is bismuth trioxide, bismuth subnitrate, bismuth metal or bismuth subcarbonate; most preferably, bismuth trioxide.

The vanadium compounds which can be used as starting materials in this process are, for example, vanadium pentoxide or ammonium meta vanadate or any vanadium compound capable of giving vanadium pentavalent ions in acid solution. Preferably, the vanadium compound is vanadium pentoxide.

Preferably, the temperature at which the reaction takes place can be between 20° and 100° C. More preferably, the reaction is run at 50°–80° C. and most preferably at 65°–70° C. The higher the temperature, the faster is the transformation of the starting materials into bismuth vanadate, but for better reaction control and reduced handling problems with nitric acid, the 65°–70° C. range appears optimum.

The course of the reaction can be monitored by visual observation of the color of the slurry in the mill. As the bismuth vanadate is formed, the color of the slurry turns from a dull brownish green to a brilliant yellow. When no further color change is observed, the reaction is deemed complete. Alternatively, at various intervals small samples can be removed from the mill, washed, dried and evaluated for strength and shade compared to an authenic control sample of the bismuth vanadate pigment in order to assess pigment quality and to ascertain whether the reaction is complete.

The bismuth vanadate pigment is finally isolated from the mineral acid suspension by centrifuging the slurry to recover the maximum mount of mineral acid for reuse; or by allowing the slurry to settle and decanting the aqueous mineral acid medium; or by filtration. The wet pigment cake may then be reslurried for encapsulation with silica or to receive any appropriate surface treatment; or the pigment can be washed with water and dried.

The dried bismuth vanadate pigment cake can then be subjected to hammer-milling or jet-milling to deagglomerate it and to render it suitable for pigment use.

The resulting bismuth vanadate compounds exhibit high quality pigmentary properties, particularly the desired bright yellow color and high tinting capacity. These pigments are particularly suited for pigmenting a wide variety of high molecular weight organic materials, including resins, oils and organic polymers. They can also be incorporated into lacquers, paints and printing inks.

The following examples further illustrate the preferred embodiments of the instant invention. In these Examples, all parts given are by weight unless otherwise stated.

Pigmentary qualities are determined utilizing rubout in an acrylic lacquer and subsequent color reading utilizing a colorimeter. In each case, 22.8 parts of dry pigment and 100 parts of lacquer are prepared as an ink dispersion, referred to as the Masstone ink, and drawn down. In order to assess color strength, 11.4 parts of pigment and 11.4 parts of pigmentary titanium dioxide are blended and drawn down. The results are noted below are obtained utilizing L, a, b (or $L^*$, $a^*$, $b^*$) colorimeter measurements wherein "L" or "$L^*$" refers to lightness, "a" or "$a^*$" refers to red-green ratio with "a" or "$a^*$" denoting redness and "-a" or "-$a^*$" denoting greeness, and "b" or "$b^*$" refers to yellow-blue ratio with "b" or "$b^*$" denoting yellowness and "-b" or "-$b^*$" denoting blueness.

EXAMPLE 1

To a 1.1 liter pebble mill filled to about 50% level with grinding media are added 48.9 grams (0.105 mol) of bismuth trioxide ($Bi_2O_3$), 18.2 grams (0.10 mol) of vanadium pentoxide ($V_2O_5$) and 200 ml of 6% by weight nitric acid to give a solid suspension of the starting materials in the nitric acid. The suspension is wet ground at a temperature of 25°–35° C. for 16 hours to form the bismuth vanadate pigment.

The mill is then emptied to remove the pigment. The pigment is washed with water to remove the nitric acid and then dried. A bright yellow pigmentary bismuth vanadate pigment results.

|   | Pigment of Example 1 | | Standard Pigment | |
|---|---|---|---|---|
|   | Masstone | Tint | Masstone | Tint |
| L | 85.8 | 89.7 | 85.9 | 91.4 |
| a | −14.1 | −15.7 | −11.5 | −14.0 |
| b | 50.5 | 43.9 | 50.3 | 42.2 |

These results show the pigment of Example 1 has pigmentary properties essentially comparable to standard bismuth vanadate pigment.

EXAMPLE 2

50 grams of bismuth subcarbonate [$(BiO)_2CO_3$] and 17.8 grams of vanadium pentoxide are suspended in 200 ml of 5% by weight nitric acid. The suspension is heated to the boil at 100° C. The product isolated from this reaction is a bright yellow pigment which is a mixture of bismuth vanadate plus unreacted bismuth subcarbonate.

EXAMPLE 3

Using the general procedure of Example 1, 50 grams of bismuth subcarbonate [$(BiO)_2CO_3$] and 17.8 grams of vanadium pentoxide are suspended in 200 ml of 5% by weight nitric acid. The suspension is milled overnight in a grinding mill. Half of the milled suspension is heated to 100° C. before isolation of the pigment. The product isolated from milled suspension is a bright yellow pigment which is bismuth vanadate. The pigment isolated from the milled suspension heated to 100° C. shows no change in color from that isolated from the unheated milled suspension indicating that the reaction goes to completion during the milling step. This is demonstrated in the table below.

|   | Standard Pigment | | Isolated Pigment | | Isolated Pigment from Suspension Heated to 100° C. | |
|---|---|---|---|---|---|---|
|   | Masstone | Tint | Masstone | Tint | Masstone | Tint |
| L | 86.0 | 91.2 | 76.3 | 88.6 | 75.8 | 88.4 |
| a | −10.4 | −13.2 | −9.1 | −15.3 | −9.9 | −15.4 |
| b | 51.3 | 42.0 | 42.8 | 41.0 | 42.5 | 41.4 |

These data show that a bismuth vanadate with pigmentary properties similar to the commercial standard bismuth vanadate pigment is prepared by the instant process.

EXAMPLE 4

Using the general procedure of Example 3, 50 grams of bismuth subnitrate ($BiONO_3$) and 15.8 grams of vanadium pentoxide are suspended in 200 ml of 5% by weight nitric acid. The suspension milled overnight in a grinding mill. Half the milled suspension is heated to the boil at 100° C. The products isolated from the unheated suspension and from the heated suspension are each a bright yellow pigment which is bismuth vanadate with essentially the same properties indicating that the reaction goes to completion during the milling step.

|   | Standard Pigment | | Isolated Pigment | | Isolated Pigment from Suspension Heated to 100° C. | |
|---|---|---|---|---|---|---|
|   | Masstone | Tint | Masstone | Tint | Masstone | Tint |
| L | 86.0 | 91.2 | 87.2 | 90.9 | 86.1 | 90.6 |
| a | −10.4 | −13.2 | −13.0 | −15.2 | −13.4 | −15.2 |
| b | 51.3 | 42.0 | 52.1 | 44.4 | 51.2 | 43.6 |

These data show that a bismuth vanadate with pigmentary properties very close to the commercial standard bismuth vanadate pigment is prepared by the instant process.

EXAMPLE 5

Example 3 is repeated except that the bismuth subnitrate and vanadium pentoxide are suspended in 200 ml of water. The suspension milled overnight in a grinding mill. Half the milled suspension is heated to the boil at 100° C. The products isolated from the unheated suspension and from the heated suspension are each a bright yellow pigment which is bismuth vanadate with essentially the same properties indicating that the reaction goes to completion during the milling step.

|   | Standard Pigment | | Isolated Pigment | | Isolated Pigment from Suspension Heated to 100° C. | |
|---|---|---|---|---|---|---|
|   | Masstone | Tint | Masstone | Tint | Masstone | Tint |
| L | 86.0 | 91.2 | 82.8 | 89.9 | 83.0 | 91.0 |
| a | −10.4 | −13.2 | −15.5 | −17.2 | −15.4 | −17.6 |
| b | 51.3 | 42.0 | 48.0 | 45.8 | 48.5 | 45.5 |

These data show that a bismuth vanadate with pigmentary properties varying somewhat compared to the commercial standard bismuth vanadate pigment is prepared by the process using water instead of nitric acid as the suspending medium.

EXAMPLE 6

Following the general procedure of Example 1, 20.9 grams (0.1 mol) of bismuth metal and 9.1 grams (0.05 mol) of vanadium pentoxide are suspended in 200 ml of 6% by weight nitric acid and then wet ground for 16 hours to form a green-shade yellow bismuth vanadate pigment.

When tested in thermosetting acrylic resin against a commercial bismuth vanadate standard pigment, the color values for the pigment of this example are seen in the table below.

|   | Pigment of Example 6 | | Standard Pigment | |
|---|---|---|---|---|
|   | Masstone | Tint | Masstone | Tint |
| L* | 84.1 | 92.5 | 87.3 | 92.2 |
| a* | −11.2 | −12.7 | −4.4 | −8.3 |
| b* | 77.2 | 57.9 | 82.5 | 56.8 |

When the pigment strength is measured using reflectance at 430 nanometers, the pigment of Example 6 is found to be 68% stronger than commercial standard bismuth vanadate pigment.

EXAMPLE 7

Following the general procedure of Example 1, 46.6 grams (0.1 mol) of bismuth trioxide ($Bi_2O_3$) and 22.2 grams (0.19 mol) of ammonium meta vanadate ($NH_4VO_3$) are suspended in 200 ml of 6% by weight nitric acid and then wet ground for 16 hours to form a bright yellow bismuth vanadate pigment.

When tested in thermosetting acrylic resin against a commercial bismuth vanadate standard pigment, the color values for the pigment of this example are seen in the table below.

|   | Pigment of Example 7 | | Standard Pigment | |
|---|---|---|---|---|
|   | Masstone | Tint | Masstone | Tint |
| L* | 86.6 | 91.5 | 87.2 | 92.1 |
| a* | −6.4 | −10.1 | −4.2 | −8.3 |
| b* | 82.6 | 63.4 | 82.1 | 56.7 |

When the pigment strength is measured using reflectance at 430 nanometers, the pigment of Example 7 is found to be 76% stronger than commercial standard bismuth vanadate pigment.

EXAMPLE 8

When in Example 1, an equivalent amount of 1N hydrochloric acid is substituted for the nitric acid, the wet grinding of bismuth trioxide and vanadium pentoxide produces some bismuth vanadate plus unreacted starting material and other unidentified compound(s).

EXAMPLE 9

When in Example 1, an equivalent amount of 1N sulfuric acid is substituted for the nitric acid, the wet grinding of bismuth trioxide and vanadium pentoxide yields a green shade yellow pigmentary bismuth vanadate pigment. X-ray diffraction identifies bismuth vanadate as the major phase.

|   | Pigment of Example 9 | | Standard Pigment | |
|---|---|---|---|---|
|   | Masstone | Tint | Masstone | Tint |
| L | 70.9 | 90.1 | 85.7 | 91.4 |
| a | −9.4 | −16.3 | −11.5 | −14.0 |
| b | 39.2 | 41.2 | 50.2 | 42.3 |

The use of sulfuric acid as the reaction and grinding medium produces bismuth vanadate pigment not yet of the quality of the commercial bismuth vanadate pigment.

EXAMPLE 10

The reaction described in Example 1 is scaled up to 552.1 grams of bismuth trioxide, 205.2 grams of vanadium pentoxide, 380.2 grams of technical grade nitric acid and 1891.7 grams of water (12% by weight nitric acid) in a large grinding mill. The mixture is ground for 7.5 hours at a temperature of 65°–70° C. to yield a bright yellow pigmentary bismuth vanadate with a tinting strength 213% of the standard bismuth vanadate pigment. The high quality of this product is achieved rapidly in part because of intensive grinding of the starting materials in the large mill and in part because of the elevated temperature.

EXAMPLE 11

When in Example 1, an equivalent amount of 1N sulfuric acid is substituted for the nitric acid and there is concomitantly present 1 mol per liter of sodium nitrate, the wet grinding of bismuth trioxide and vanadium pentoxide yields a yellow pigmentary bismuth vanadate pigment of high quality as seen below when compared to commercial bismuth vanadate pigment.

|   | Pigment of Example 11 | | Standard Pigment | |
| --- | --- | --- | --- | --- |
|   | Masstone | Tint | Masstone | Tint |
| L | 80.6 | 91.4 | 85.7 | 91.4 |
| a | −13.0 | −17.0 | −11.5 | −14.0 |
| b | 46.6 | 42.6 | 50.2 | 42.3 |

What is claimed is:

1. A process for the preparation of yellow pigmentary bismuth vanadate which comprises
    (a) preparing a suspension of 10–50% by weight, based on the total suspension, of a mixture of a solid bismuth compound and a solid vanadium compound where the molar ratio of bismuth:vanadium is 1:1 to 1:0.8, and of 90–50% by weight, based on the total suspension, of an aqueous mineral acid solution at a pH about 1,
    (b) wet grinding the suspension from step (a) at a temperature between 0° C. and 100° C. until the bismuth compound and the vanadium compound are transformed into the yellow pigmentary bismuth vanadate, and
    (c) isolating the bismuth vanadate from the mineral acid solution.

2. A process according to claim 1 wherein the mixture of a solid bismuth compound and a solid vanadium compound is 20–40% by weight of the total suspension.

3. A process according to claim 1 wherein the wet grinding of step (b) is carried out at a temperature of 20°–100° C.

4. A process according to claim 3 wherein the temperature is 50°–80° C.

5. A process according to claim 4 wherein the temperature is 65°–70° C.

6. A process according to claim 1 wherein the molar ratio of bismuth:vanadium is from 1:1 to 1:0.9.

7. A process according to claim 1 wherein the aqueous mineral acid is 80–60% by weight of the suspension.

8. A process according to claim 1 wherein the mineral acid is hydrochloric acid, sulfuric acid, phosphoric acid or nitric acid.

9. A process according to claim 8 wherein the mineral acid is sulfuric acid or nitric acid.

10. A process according to claim 9 wherein the mineral acid is nitric acid.

11. A process according to claim 1 wherein the mineral acid is a mixture of mineral acids.

12. A process according to claim 1 wherein the suspension additionally contains an alkali metal salt of a mineral acid.

13. A process according to claim 12 wherein the suspension contains sodium nitrate in the presence of sulfuric acid.

14. A process according to claim 1 wherein the wet grinding is carried out in a pebble or ball mill, a vertical or horizontal bead mill, or in an attritor or in a vibro-energy mill made from or lined with porcelain, ceramic, stainless steel, polyurethane or other acid-resistant material.

15. A process according to claim 1 wherein the bismuth compound is bismuth trioxide, bismuth subnitrate, bismuth subcarbonate, bismuth carbonate, bismuth nitrate, bismuth oxalate, bismuth hydroxide or bismuth metal.

16. A process according to claim 15 wherein the bismuth compound is bismuth trioxide, bismuth subnitrate, bismuth metal or bismuth subcarbonate.

17. A process according to claim 16 wherein the bismuth compound is bismuth trioxide.

18. A process according to claim 1 wherein the vanadium compound is vanadium pentoxide or ammonium meta vanadate.

19. A process according to claim 18 wherein the vanadium compound is vanadium pentoxide.

20. A process according to claim 1 wherein the bismuth compound is bismuth trioxide, the vanadium starting material is vandium pentoxide and the mineral acid is nitric acid.

21. A process according to claim 1 wherein the bismuth vanadate pigment is isolated by filtration and is washed with water.

22. A process according to claim 1 wherein the bismuth vanadate is isolated by centrifugation or decantation.

* * * * *